United States Patent [19]
Ford et al.

[11] Patent Number: 5,486,219
[45] Date of Patent: Jan. 23, 1996

[54] COATABLE UREA-ALDEHYDE SOLUTIONS CONTAINING A COCATALYST, COATED ABRASIVES MADE USING SAID SOLUTIONS, AND METHOD OF MAKING COATED ABRASIVES

[75] Inventors: Jeffrey E. Ford, Woodbury; Ellen Y. Chu, Stillwater; Harold E. Rude, Roseville, all of Minn.

[73] Assignee: Minnesota Mining and Manufacturing Company, St. Paul, Minn.

[21] Appl. No.: 300,854

[22] Filed: Sep. 6, 1994

Related U.S. Application Data

[63] Continuation of Ser. No. 945,126, Sep. 15, 1992, abandoned.

[51] Int. Cl.$^6$ .................................................. C09K 3/14
[52] U.S. Cl. .............................. 51/298; 51/307; 51/308; 51/309
[58] Field of Search ................................ 524/593; 51/298, 51/307, 308, 309

[56] References Cited

U.S. PATENT DOCUMENTS

| | | | |
|---|---|---|---|
| 1,355,834 | 10/1920 | John | 260/69 |
| 2,518,388 | 8/1950 | Simons | 154/45.9 |
| 2,958,593 | 11/1960 | Hoover et al. | 51/295 |
| 3,781,172 | 12/1973 | Pett et al. | 51/309 |
| 3,849,949 | 11/1974 | Steinhauser et al. | 51/406 |
| 3,891,408 | 6/1975 | Rowse et al. | 51/295 |
| 3,893,826 | 7/1975 | Quinan et al. | 51/295 |
| 3,933,274 | 1/1976 | Kmmons | 222/94 |
| 4,505,720 | 3/1985 | Gabor | 51/295 |
| 4,518,397 | 3/1985 | Leitheiser et al. | 51/293 |
| 4,574,003 | 3/1986 | Gerk | 51/309 |
| 4,744,802 | 5/1988 | Schwabel | 51/309 |
| 4,748,043 | 5/1988 | Seaver et al. | 427/30 |
| 4,761,441 | 8/1988 | Woodson | 523/439 |
| 4,770,671 | 9/1988 | Monroe et al. | 51/293 |
| 4,855,354 | 8/1989 | Mohler et al. | 525/54.24 |
| 4,881,951 | 11/1989 | Wood et al. | 51/309 |
| 4,903,440 | 2/1990 | Larson et al. | 51/298 |
| 5,061,294 | 10/1991 | Harmer et al. | |
| 5,093,759 | 3/1992 | Davis et al. | 361/388 |

FOREIGN PATENT DOCUMENTS

| | | |
|---|---|---|
| 0501174A1 | 9/1992 | European Pat. Off. . |
| 2203847 | 5/1974 | France . |
| 419812 | 11/1934 | United Kingdom . |
| 1510781 | 5/1978 | United Kingdom . |
| 92/01018 | 1/1992 | WIPO . |

OTHER PUBLICATIONS

Borden Chemical Technical Brochure; "Durite Abrasive Binder AL8405".
Russion Author's Certificate No.: 738745, published Jun. 5, 1980.
B. Meyer, "Urea Formaldehyde Resins," Addison–Wesley Publishers, Boston 1979.
Meyers et al., *J. of Applied Polymer Science*, vol. 42, p. 2997 (1991).
Watson et al., *A Differential Scanning Calorimeter for Quantative Differential Thermal Analysis*, Anal. Chem., vol. 36, No. 4, pp. 1233–1238 (Jun. 1964).
Borden Trade Lit for AL–3029R, Durite Urea–Formaldehyde Resin, Dated Nov. 1993.

*Primary Examiner*—Edward Chin
*Attorney, Agent, or Firm*—Gary L. Griswold; Walter N. Kirn; Doreen S. L. Gwin

[57] ABSTRACT

Coatable urea-aldehyde binder precursor compositions including a urea-aldehyde resin and a cocatalyst yield more consistent quality coated abrasives. In addition, the compositions have longer pot life and allow curing at lower temperatures. The urea-aldehyde resins have an aldehyde/urea ratio of at least about 1.0, more preferably ranging from about 1.0 to about 2.0, and a free aldehyde content ranging from about 0.1 to about 3.0 weight percent based on weight of total aldehyde. The cocatalyst consists essentially of a Lewis acid and a salt selected from the group consisting of ammonium ion salts and organic amine salts. Methods of making coated and other abrasive articles using the compositions are also described.

25 Claims, 1 Drawing Sheet

COATABLE UREA-ALDEHYDE SOLUTIONS CONTAINING A COCATALYST, COATED ABRASIVES MADE USING SAID SOLUTIONS, AND METHOD OF MAKING COATED ABRASIVES

This is a continuation of application Ser. No. 07/945,126 filed Sep. 15, 1992 now abandoned.

BACKGROUND OF THE INVENTION

1. Field of the Invention

The present invention relates to coatable urea-aldehyde binder precursor compositions having low free aldehyde content which are catalyzed to cured binders by a cocatalyst. The catalyst is described as a "cocatalyst" because it has two components: an ammonium salt (such as ammonium chloride, ammonium nitrate, ammonium thiocyanate, and the like) and a Lewis acid (such as aluminum chloride, ferric chloride, and the like). The cocatalyst is especially useful in the production of coated abrasive articles.

2. Description of Related Art

The use of acid/base reactions to control the addition and condensation reactions of urea-formaldehyde (UF) dates back to the 1918 work of Hanns John. (This discussion uses urea-formaldehyde merely as the preferred resin and for purposes of discussion.) It is generally accepted that a nucleophilic component is necessary for an amino-carbonyl condensation via reactions 1–3 (all aqueous):

1) $CH_2O + H^+ \longleftrightarrow \overset{+OH}{\underset{\|}{HCH}}$

2) $NH_2CONH_2 + \overset{+OH}{\underset{\|}{HCH}} \longleftrightarrow NH_2CONH_2^+ - CH_2OH$ 3) $NH_2CONH_2^+ - CH_2OH \longleftrightarrow NH_2CONHCH_2OH + H^+$.

Although the addition reaction (reaction 2) is both acid and base catalyzed, the condensation reaction (reaction 4) is exclusively acid catalyzed:

$$NH_2CONHCH_2OH + H_2NCONH_2 \underset{H^+}{\longrightarrow} NH_2CONHCH_2NHCONH_2 + H_2O. \quad 4)$$

The nucleophilic component necessary for amino-carbonyl condensations can be provided by any of a variety of proton donors. The most common classes are mineral acids, OH—acidic compounds, acidic SH, NH and CH moieties, and some olefins.

UF was first patented for use as an adhesive for coated abrasives by Minnesota Mining and Manufacturing Company ("3M") in the mid 1930's (Great Britain Patent No. 419,812). Since that time a number of different coated abrasive products have been made with acid catalyzed UF resins. Today, the two most common catalysts used with UF resins are aluminum chloride (AlCl₃) and ammonium chloride (NH₄Cl).

Coated abrasives typically comprise a backing such as paper, cloth, and the like, which has adhered thereto (with a binder) a plurality of abrasive particles. One typical binder used in coated abrasives is a condensation copolymerization reaction product of an aldehyde with urea and/or urea derivatives. Urea-aldehyde binders possess uniformity of physical properties whereby any desired, predetermined degree of thickness and color binder may be obtained, while still maintaining a desirable degree of flexibility of the coated abrasive. Urea-aldehyde binders are also resistant to a wide range of liquids used in sanding operations, such as water, organic solvents or inorganic materials, such as acids or alkalis.

Although urea-aldehyde resins have enjoyed great success in coated abrasives, the need to reduce the use of solvents and unreacted reactants which contribute to release of volatile organic hydrocarbons (VOC) in the process of making coated abrasives, and the need to increase the quality of the abrasives while maintaining or increasing their level of performance is challenging the industry.

Meanwhile, the appearance to the user of the coated abrasive is important. It has been interestingly found that, when attempting to increase the abrading performance of coated abrasives made using urea-aldehyde resins when aluminum chloride is used alone as the catalyst, a higher temperature than normal must be used to cure the urea-aldehyde resin, which in turn leads to curling of edges of the coated abrasive. (The use of aluminum chloride as a catalyst for urea-formaldehyde resins in the making of coated abrasive articles is known.) Therefore, it would be advantageous if the abrading performance of coated abrasives made using urea-aldehyde resins could be increased without sacrificing the appearance or increasing the waste of coated abrasive.

When the AlCl₃ catalyst is used alone, the gel time, pot life and peak exotherm temperatures are all dependent on the concentration of the AlCl₃. Thus, the performance of the coated abrasive is dependent upon the concentration of the AlCl₃, and the cure conditions (time and temperature).

In order to achieve a good performing product using factory cure conditions (i.e temperature ranging from about 65° C. to about 95° C.), the concentration of AlCl₃ should be near 1 weight percent, based on weight of binder precursor. The drawback with a 1 weight percent concentration of AlCl₃ is that the pot-life may be too short for batch operations typically used in the factory with urea-aldehyde resins having low (about 0.1 to about 1.0 weight percent) free aldehyde content, based on total weight of aldehyde.

When NH₄Cl is used alone as the catalyst, the gel time, pot life and peak exotherm temperatures are all independent of the NH₄Cl concentration, affording an advantage over the use of a Lewis acid catalyst. However, the activity (ability of the catalyst to catalyze the reaction) of the NH₄Cl was dependent on the free formaldehyde concentration in the binder precursor composition due to the following reaction:

$$6CH_2(OH)_2 + 4NH_4Cl \rightarrow (CH_2)_6N_4 + 4HCl + 12H_2O. \quad 5)$$

With low free aldehyde resins, such as that known under the trade designation AL3029R from Borden Chemical, the NH₄Cl does not activate the condensation reaction (4) very readily until the temperature of the reaction is increased above that normally used. However, as mentioned above, increased temperature tends to curl the edges of the coated abrasive and does not render performance improvements. The performance of the coated abrasive is independent of the NH₄Cl concentration. Thus, the drawbacks of this system are the long gel times, and only moderate performance levels are obtained with typical factory cure conditions.

No art is known to the inventors that describes the use of a cocatalyst comprising an ammonium salt and a Lewis acid which is useful in making of coated abrasive articles or any benefit which would be derived therefrom.

Therefore, it would be an advance in the art to provide a binder precursor composition (preferably a solution or dispersion) which includes a urea-aldehyde resin and cocatalyst system and coated abrasives which meet these needs. It is the primary object of the present invention to provide such compositions which will, when cured, provide a coated abrasive binder having uniformity of physical properties as is previously known, but which also allow higher production runs of coated abrasives without curling of the edges of the coated abrasive web and increased abrasion performance.

The above-mentioned Great Britain Patent No. 419,812 gives a good account of the advantages of urea-aldehyde binders in the manufacture of flexible abrasive articles such as coated abrasives. The patentee notes that it is desirable on some occasions that the urea-aldehyde solution gel quickly after application. To achieve this there may be added a water soluble non-alkaline salt having a high degree of electrolytic dissociation, such as ammonium salts of both strong and weak acids. However, there is no disclosure of the use of a Lewis acid in conjunction with an ammonium salt as a cocatalyst system for urea-aldehyde binders.

U.S. Pat. No. 2,518,388 (Simons) describes the preparation of improved urea-formaldehyde adhesive compositions. A hardening catalyst is added to the urea-formaldehyde along with a compound containing a furan ring structure, such as furfuryl alcohol or furfural. A catalyst is made up of three parts by weight ammonium chloride and ten parts by weight water or two parts ammonium chloride, one part ferric chloride and seven parts water. The former catalyst is stated to give a longer working life while the latter catalyst system is said to give a faster cure but a shorter working life of the liquid adhesive. There is no discussion of the use of such a catalyst system with urea-aldehyde resins in a coated abrasive product nor the benefits which might be derived from the use of such a catalyst in the production of abrasive products.

U.S. Pat. No. 3,933,274 (Emmons et. al.) describes a latent acid catalyst which catalyzes the crosslinking of cellulose molecules with formaldehyde in cellulosic fabrics. The crosslinking reaction is conducted under acidic conditions using a latent acid catalyst, which ideally only becomes strongly acidic on exposure to high temperatures so that it does not cause premature crosslinking when the cellulosic fabric is impregnated. Latent acid catalysts are described as usually being inorganic salts, for example aluminum chloride, magnesium sulfate and perfluorate, ammonium chloride, sulfate, nitrate and tartrate. There is no disclosure of the use of the combination of an ammonium salt and a Lewis acid nor the use of such a combination in a binder precursor composition used to form an abrasive product.

U.S. Pat. No. 4,761,441 (Woodson) describes acid-curable resin compositions comprising a mixture of a furan resin and a minor amount of an acid-curable epoxy resin. The acid-curable resin compositions may contain acid catalysts, acid catalysts being described as generally well-known and being either inorganic acids, organic acids, or salts thereof, examples of inorganic acids including ferric chloride, and examples of inorganic salts which are normally used include ammonium chloride, ammonium sulfate, ammonium nitrate, aluminum chloride, and the like. The patent also notes that furan resins have been used as binders in, among other things, grinding wheels and coated abrasives. The patentee notes that mixtures of acids and acid salts can be utilized as the acid catalyst for curing the acid-curable resins; however, there is no suggestion of a mixture of an ammonium salt with a Lewis acid as a cocatalyst for urea-aldehyde resins.

U.S. Pat. No. 4,855,354 (Mohler et. al.) describes a curable aldehyde resin and starch composition useful as a saturant and laminating adhesive for paperboard products. The aldehyde resin possesses a low level of free-formaldehyde, while the adhesive composition is described by Mohler et. al. as curable upon the addition of or exposure to a sufficient amount of curing agent such as aluminum chloride. However, there is no suggestion of the use of a combination of ammonium salt with a Lewis acid as a cocatalyst system, nor the use of such a system for making an abrasive product.

Russian Author's Certificate No. 738745 (published Jun. 5, 1980) describes a heat hardening mold mixture for production of casting rods which comprises a urea-formaldehyde binder, a phenol-formaldehyde binder, a "complex acidic catalyst" and other ingredients The complex acidic catalyst is described as a solution of ammonium chloride, aluminum chloride and technical urea in water. There is no suggestion of the use of a mixture of ammonium chloride/ aluminum chloride, or any other cocatalyst system in a coatable urea-aldehyde composition, such as would be useful in the making of an abrasive product.

Coated and nonwoven abrasive articles are described generally in U.S. Pat. Nos. 4,903,440 and 2,958,593, respectively. A technical brochure from Borden Chemical entitled "Durite Abrasive Binder AL8405" describes the urea-formaldehyde resins catalyzed solely by aluminum chloride. The brochure also mentions the use of ammonium chloride, but not as part of a cocatalyst system. See also U.S. Pat. No. 1,355,834, and Meyer, B. "Urea-Formaldehyde Resins", Addison-Wesley Publishing, Boston, (1979). The use of organic amine salts as such as the dichloride salt of hexamethylene diamine as flexibilizers in urea-formaldehyde binder precursor compositions is described by Myers et al., J. of Applied Polymer Science, Vol. 42, p. 2997 (1991).

SUMMARY OF THE INVENTION

In accordance with the present invention, coatable binder precursor compositions which include a urea-aldehyde resin having a low free aldehyde content and a cocatalyst exhibit improved pot-life (relative to urea-aldehyde resins catalyzed solely by a Lewis acid or solely by an ammonium ion salt) while maintaining or increasing the reactivity of the resin.

More particularly, one aspect of the invention is a coatable urea-aldehyde binder precursor composition comprising a urea-aldehyde resin and a cocatalyst. The urea-aldehyde resin has an aldehyde/urea ratio of at least about 1.0, more preferably ranging from about 1.0 to about 2.0, and a "free aldehyde" content ranging from about 0.1 to about 3.0 weight percent, more preferably ranging from about 0.1 to about 1.0 weight percent, based on weight of original aldehyde. "Free aldehyde" as used herein means that weight percent of the total weight of aldehyde that is not reacted with urea.

The cocatalyst consists essentially of a Lewis acid, preferably aluminum chloride ($AlCl_3$), and an organic amine salt or an ammonium salt. If an ammonium ion salt is used it is preferably ammonium chloride ($NH_4Cl$). Mixtures of inorganic and organic salts are typically, and in some cases, preferably utilized.

The urea-aldehyde resins useful in the invention may be "modified" or "unmodified" as those terms are known and used in the art. The term "modified" is meant to denote that the urea is modified by reaction with furfuryl alcohol and/or melamine prior to or during the reaction with the aldehyde.

Abrasive articles are another aspect of the invention. Coated abrasives, which comprise a make coating which anchors and orients a plurality of abrasive particles to a backing and size coatings which further support the abrasive particles, wherein at least one of the size and make coatings is made from the binder precursor composition of the invention, are one type of abrasive article made in accordance with the teachings of the invention.

A method of making a coated abrasive having a plurality of abrasive particles secured to a backing by a urea-aldehyde binder is also presented, the method comprising the steps of:

(a) providing a coatable urea-aldehyde binder precursor composition of the invention as above-described;

(b) coating the composition onto a backing to form a coated backing;

(c) applying a plurality of abrasive particles to the coated backing; and (d) subjecting the product of step (c) to conditions sufficient to cure the urea-aldehyde resin.

Nonwoven abrasives in the form of an open, lofty, three-dimensional web of fibers bonded together at a plurality of points where the fibers contact each other by a cured urea-aldehyde binder are also considered within the scope of the invention. The binder may also serve to adhere abrasive particles to the fibers of the web.

The binder precursor compositions of the invention exhibit adequate pot-life, reduced gel time, and increased resin reactivity which results in reasonable cure conditions. The result is a coatable urea-aldehyde binder precursor composition having a controlled cure that improves the performance and appearance of the abrasive products, particularly coated abrasives. Other features and advantages of the invention will be revealed by reading the description which follows.

DESCRIPTION OF PREFERRED EMBODIMENTS

The term "coatable", as used herein, means that the binder precursor compositions of the invention may be easily coated or sprayed onto substrates using coating devices which are conventional in the abrasives art, such as knife coaters, roll coaters, flow-bar coaters, electrospray coaters, and the like. This characteristic may also be expressed in terms of viscosity of the binder precursor compositions. The viscosity of the coatable binder precursor compositions should not exceed about 2000 centipoise (cps), measured using a Brookfield viscometer, number 3 spindle, 30 rpm, at room temperature (about 25 ° C). More preferably, the viscosity should range from about 70 to about 900 cps. As used herein, the term "coatable binder precursor composition" means a coatable, homogeneous mixture including uncured urea-aldehyde resin and water, which, upon curing, becomes a binder. The term "binder" means a cured binder.

The term "percent solids" means the weight percent organic material that would remain upon application of curing conditions. Percent solids below about 30% are not practical to use because of VOC emissions, while above about 95% solids the binder precursor compositions are difficult to render coatable, even when heated.

It is important to note that the reactivity and cure of urea-aldehyde resins are dependent on the aldehyde/urea ratio of the resin, type of catalyst, catalyst concentration, pH (defined as negative base ten logarithm of the hydrogen ion concentration) of the binder precursor compositions after addition of other additives, and the time and temperature used for curing. As mentioned previously, another important factor appears to be the amount of "free" aldehyde. As urea-aldehyde resins currently preferred for use in coatable compositions typically have low free aldehyde content for environmental purposes, a need has arisen for an improved catalyst that will work well with this type of resin.

Cocatalyst Systems Lewis Acid Component

Binder precursor solutions in accordance with the invention employ a cocatalyst system. The cocatalyst consists essentially of a Lewis acid, preferably aluminum chloride ($AlCl_3$), and an organic or inorganic salt. A Lewis acid catalyst is defined simply as a compound which accepts an electron pair, and preferably has an aqueous solubility at 15° C. of at least about 50 grams/cc.

Preferred are those Lewis acids (or compounds which behave as Lewis acids) selected from the group consisting of aluminum chloride, iron (III) chloride, and copper (II) chloride. Particularly preferred is the Lewis acid aluminum chloride in either its non-hydrated form ($AlCl_3$) or hexahydrate form ($AlCl3.6H_2O$).

The Lewis acid is typically and preferably used in the binder precursor solutions at an amount ranging from about 0.1 to about 5.0 weight percent of the total weight of binder precursor, as a 20–30 % solids aqueous solution. If aluminum chloride ($AlCl_3$) is used, it has been found that 0.6 weight percent of a 28 % solids aqueous solution of $AlCl_3$ gives excellent results.

Salt Component

Ammonium Ion Salts

Cocatalysts useful in the invention consist essentially of a Lewis acid, preferably aluminum chloride ($AlCl_3$), and an aqueous organic amine salt or an ammonium ion salt. If an ammonium ion salt is used it is preferably a salt of ammonium ion ($NH_4^+$) halide ion such as chloride ion ($Cl^-$), fluoride ion ($F^-$), bromide ion ($Br^-$), and the like. A particularly preferred ammonium ion salt is ammonium chloride ($NH_4Cl$). Binder precursors in accordance with the invention preferably employ an ammonium ion salt having an aqueous solubility at 0° C. of at least about 20 grams/cc.

Ammonium sulfate (($NH_4)_2SO_4$), ammonium peroxydisulfate (($NH_4)_2S_2O_8$), ammonium thiosulfate (($NH_4)_2S_2O_3$), and ammonium nitrate ($NH_4NO_3$) are deemed within the scope of the invention as useful ammonium ion salts when used specifically in combination with $AlCl_3$ as cocatalyst. In particular, although the cocatalyst $AlCl3/(NH_4)_2SO_4$ showed little improvement compared with use of $AlCl_3$ as catalyst alone in terms of coated abrasive performance, it was surprisingly found that a coated abrasive made using this cocatalyst did not diminish performance.

The weight ratio of Lewis acid to ammonium ion salt typically and preferably ranges from about 0.6:1 to about 0.15:1 on a dry weight basis.

Ammonium ion salts are used in the binder precursor compositions of the invention at an amount ranging from about 0.5 to about 5.0 weight percent of the total solids weight of the composition, as a 20–30 weight percent solids aqueous solution. If ammonium chloride is used as the ammonium ion salt as preferred, it has been found that 2.0 weight percent (as a percentage of total weight of solids) of a 25 weight percent solids aqueous solution gives excellent results.

Organic Amine Salts

It may be desirable to use as the salt component a linear or branched chain organic amine salt of the type having a plurality of methylene units separating terminal amine groups. Organic amine salts render flexibility to the finished abrasive articles of the invention. Preferred linear organic amine salts are those selected from the group of compounds having the general formula $$(X^-)^+H_3N(CH_2)_nNH_3^+(Y^-)$$

wherein X and Y are halide atoms that may be the same or different and n is an integer ranging from about 3 to about 10. An example of such a linear organic amine salt found useful by the inventors herein is the dichloride salt of hexamethylene diamine, obtained by the acidification of an aqueous solution of hexamethylene diamine with hydrochloric acid (HCl). One branched chain organic amine salt found useful is that known under the trade designation "Dytek-A", available from du Pont, which is commonly known as 2-methyl-pentamethylene diamine.

Mixtures of ammonium ion salts and organic amine salts are typically, and in some cases, preferably utilized in the binder precursor compositions of the invention. For example, the salt component of the cocatalyst may be comprised of 50 percent ammonium chloride, 50 percent dichloride salt of hexamethylene diamine, on a weight basis.

Urea-aldehyde Resins

Urea-aldehyde resins employed in the coatable binder precursor compositions of this invention may be comprised of urea or any urea derivative and any aldehyde which are capable of being rendered coatable, have the capability of reacting together at an accelerated rate in the presence of a cocatalyst, and which afford an abrasive article with abrading performance acceptable for the intended use. The resins comprise the reaction product of an aldehyde and a "urea" (as further defined herein). Urea-formaldehyde resins are preferred in the abrasive industry, as noted above, because of their thermal properties, availability, low cost, and ease of handling. The urea-aldehyde resins preferably are 30–95% solids, more preferably 60–80% solids, with a viscosity ranging from about 125 to about 1500 cps (Brookfield viscometer, number 3 spindle, 30 rpm, 25° C.) before addition of water and catalyst and have molecular weight (number average) of at least about 200, preferably varying from about 200 to 700.

A particularly preferred urea-aldehyde resin for use in the present invention is that known under the trade designation AL3029R, from Borden Chemical. This is an unmodified (i.e. contains no furfural) urea-formaldehyde resin, 65% solids, viscosity (Brookfield, #3 spindle, 30 rpm, 25° C.) of 325 cps, a free formaldehyde content of 0.1–0.5%, and a mole ratio of formaldehyde to urea ("F/U ratio") of ranging from about 1.4 to about 1.6.

Preferred and particularly preferred ranges for ingredients of the binder precursors of the invention employing the urea-formaldehyde resin known under the trade designation "AL3029R are shown in Table A.

TABLE A

| Preferred binder precursor formulations including the cocatalyst system, in weight percent | | |
|---|---|---|
|  | Preferred | More Preferred |
| AL3029R (65% solids) | 70–95 | 80–95 |
| $H_2O$ | 5–10 | 7–8 |
| $NH_4Cl$ (25% solids) | 3–6 | 4–5 |
| $AlCl_3$ (28% solids) | 0.1–1.0 | 0.5–0.7 |

Aldehydes

Aldehydes which are useful in forming the urea-aldehyde resins useful in the coatable binder precursor compositions of the present invention include cyclic and normal and branched chain alkyl and alkylene aldehydes, and aromatic aldehydes. Preferably, the aldehydes have molecular weight below about 300 to afford a less viscous binder precursor composition. Examples of suitable aldehydes include formaldehyde, benzaldehyde, propanol, hexanal, cyclohexane carboxaldehyde, acetaldehyde, butyraldehyde, valeraldehyde, and other low molecular weight aldehydes. Preferred is formaldehyde, for its availability, low cost, cured resin properties, and because it affords low viscosity binder precursor compositions.

Ureas, Urea derivatives, and Thioureas

"Urea" as used in accordance with the invention is not limited to urea ($H_2NCONH_2$), but is meant to include straight and branched chain urea derivatives and cyclic urea derivatives, as well as thioureas. Urea-derivatives useful in the invention preferably have at least one functional group which is reactive with the aldehyde. Although urea is preferred for use in the coatable binder precursor compositions of the invention due to its aforesaid advantages in abrasive articles, it sometimes advantageous to substitute a urea derivative for a portion of the urea to modify physical properties of the resultant abrasive article, and/or to reduce emissions of VOC (such as unreacted free aldehyde). Useful urea derivatives may be selected from the group consisting of compounds represented by the general formula and mixtures thereof wherein X=O or S, each of $R^1$, $R^2$, $R^3$, and $R^4$ is a monovalent radical selected from the group consisting of hydrogen, alkyl groups having 1 to about 10 carbon atoms, hydroxyalkyl groups having from about 2 to 4 carbon atoms and one or more hydroxyl groups, and hydroxypolyalkyleneoxy groups having one or more hydroxyl groups, and with the provisos that:

(i) said compound contains at least one —NH and one —OH group or at least two —OH groups or at least two —NH groups;

(ii) $R^1$ and $R^2$ or $R^1$ and $R^3$ can be linked to form a ring structure; and (iii) $R^1$ $R^2$ $R^3$ and $R^4$ are never all hydrogen at the same time.

Preferred urea derivatives, if used, include those wherein $R^1$ is 2-hydroxyethyl, $R^2$ and $R^3$ are linked to form an ethylene bridge, and $R^4$ is hydrogen, which forms hydroxyethyl ethylene urea or HEEU. Other representative urea derivatives within the general formula include N-2-hydroxyethyl-N'-butyl urea, N,N'-bis-(2-hydroxyethyl)-N'-butyl urea, and N,N'-bis(2hydroxyethyl)urea. Other urea derivatives useful in the present invention are listed in column 7 of U.S. Pat. No. 5,039,759, which is incorporated herein by reference. HEEU is available under the trade designation "UCAR RD-65-2", from Union Carbide Corporation.

Representative examples of thioureas which are useful in the practice of the present invention are thiourea compounds represented by general formula (I) above only wherein X=S.

Preparation of the above mentioned ureas and thioureas proceeds by methods known in the art. For example, preparation of N-(2-hydroxyethyl)-N, N'-ethylene urea may proceed by reacting equimolar mixtures of amino ethyl ethanolamine and dimethyl carbamate in a nitrogen purged vessel with heating (about 80° C). The mixture is stirred for about three hours before being allowed to stand overnight. The mixture is then heated again while recovering methanol and other volatile materials up to about 195° C. The material remaining in the vessel is then subject to vacuum distillation, producing a distillate of the urea. Details on preparing this and other ureas are disclosed in U.S. Pat. No. 5,039,759, columns, 9–13, which are incorporated herein by reference.

Optional Ingredients

Typically and preferably a solvent is added as needed to render the binder precursor compositions of the invention coatable. The solvent is preferably water, but those skilled in the art will realize with minimal experimentation that an organic solvent may be necessary, depending on the coating method, aldehyde, urea derivative, and the like. When water is used solely as the solvent it is preferably added up to the water tolerance of the binder precursor solution, although this is not necessary to render the compositions of the invention coatable. A water tolerance greater than about 100% is preferred, greater than about 150% especially preferred. ("Water tolerance" is defined as the measurement of the maximum weight percent of distilled water, based on initial resin weight, which can be added to a stirred, uncured resin via titration to begin causing visual phase separation (as evidenced by milky appearance) of the resin/water mixture into aqueous and organic phases.)

The coatable binder precursor compositions of the present invention can contain fillers, fibers, lubricants, grinding aids, wetting agents, and other additives such as surfactants, pigments, dyes, coupling agents, plasticizers, and suspending agents. The amounts of these materials are selected to give the properties desired. Alternatively, the binder precursor compositions of the invention may be formulated without these additives, and the additives mixed into the binder precursor just prior to coating onto a substrate.

Fillers are frequently used in abrasive articles to reduce cost and improve dimensional stability and other physical characteristics. Fillers can be selected from any filler material that does not adversely affect the rheological characteristics of the binder precursors or the abrading performance of the resulting abrasive article. Preferred fillers include calcium metasilicate, aluminum sulfate, alumina trihydrate, cryolite, magnesia, kaolin, quartz, and glass. Fillers that function as grinding aids are cryolite, potassium fluoroborate, feldspar, and sulfur. Fillers can be used in varying amounts limited only by the proviso that the abrasive article retains acceptable mechanical properties (such as flexibility and toughness).

Abrasive Articles

Coated abrasive articles that may be produced by incorporating cured versions of the coatable binder precursor compositions of the invention typically include a flexible backing, such as paper sheet, cloth fabric, nonwoven substrates, vulcanized fiber, polymeric film, and combinations and treated versions thereof. The untreated backing may optionally be treated with saturant, backsize, and/or presize coatings. For a treated cloth backing there is typically and preferably no clear line of demarcation between the saturant coating, backsize coating and the presize coating which meet in the interior of the cloth backing which is saturated as much as possible with the resins of these coatings.

Typical saturant coatings may include acrylic latices, natural rubber, thermally curable resins, and the urea-aldehyde resins described above. Backsize and presize coatings may also comprise the urea-aldehyde resins described herein.

A make coating is then coated onto the untreated or treated backing, and before the make coating is cured, abrasive particles are deposited thereon. Typically and preferably the make coating is partially cured or gelled after application of abrasive particles and before application of a size coating.

Coated abrasive articles made in accordance with this invention can also include such modifications as are known in this art. For example, a back coating such as a pressure-sensitive adhesive (PSA) can be applied to the non-abrasive side of the backing, and various supersize coatings, such as zinc stearate, can be applied to the abrasive surface to prevent abrasive loading; alternatively, the supersize coating can contain grinding aids to enhance the abrading characteristics of the coated abrasive, or a release coating to permit easy separation of PSA from the coated abrasive surface in cases where the coated abrasive is in the form of a roll of abrasive sheets, as illustrated in U.S. Pat. No. 3,894,949, incorporated by reference herein.

Representative PSAs useful for abrasive articles of the invention include latex crepe, rosin, acrylic polymers and copolymers such as polybutylacrylate and the like, polyacrylate esters, vinyl ethers such as polyvinyl n-butyl ether and the like, alkyd adhesives, rubber adhesives such as natural rubber, synthetic rubber, chlorinated rubber, and the like, and mixtures thereof. A particularly preferred type of PSA is a copolymer of isooctylacrylate and acrylic acid.

In the coated abrasive embodiments of the invention it is common and sometimes preferable to utilize a "nonloading" or "load-resistant" supersize coating. "Loading" is the term used in the abrasives industry to describe the filling of spaces between the abrasive particles with swarf (the material abraded form the workpiece) and the subsequent build-up of that material. For example, during wood sanding, swarf comprised of particles becomes lodged in the spaces between abrasive particles, dramatically reducing the cutting ability of the abrasive particles. Examples of such loading resistant materials include metal salts of fatty acids, urea-formaldehyde resins, waxes, mineral oils, crosslinked siloxanes, crosslinked silicones, fluorochemicals, and combinations thereof. A particularly preferred load resistant supersize coating is zinc stearate in a cellulosic binder.

Nonwoven abrasive articles are also within the scope of the invention. An open, lofty fibrous substrate is provided having a binder which binds fibers at points where they contact, the binder made from a binder precursor composition of the invention. Optionally, abrasive particles or non-abrasive particles (such as fillers) may be adhered to the fibers by the binder if the user desires. Nonwoven abrasives are described generally in U.S. Pat. No. 2,958,593, incorporated by reference-herein.

Cured binder precursors of this invention can also be used to make bonded abrasive products. Bonded abrasive products typically consist of a shaped mass of individual or agglomerated abrasive grains held together by an organic or ceramic binder material. The shaped, cured mass is preferably in the form of a grinding wheel. However, it is not necessary to place the binder precursor composition and abrasive grains into a mold prior to curing the binder precursor. For example, the binder precursor and abrasive grains may be poured onto a surface and cured into a flat sheet of bonded abrasive.

Abrasive particles useful in the invention can be of any conventional grade utilized in the formation of coated and nonwoven abrasives and can be formed of, for example, flint, garnet, aluminum oxide, ceramic aluminum oxide, alumina zirconia (including fused alumina zirconia such as disclosed in U.S. Pat. Nos. 3,781,172; 3,891,408; and 3,893,826, commercially available from the Norton Company of Worcester, Mass., under the trade designation "NorZon"), diamond, silicon carbide (including refractory coated silicon carbide such as disclosed in U.S. Pat. No. 4,505,720), alpha alumina-based ceramic material (available from Minnesota Mining and Manufacturing Company under the trade designation "CUBITRON") as disclosed in U.S. Pat. Nos. 4,314,827; 4,518,397; 4,574,003; and 4,744,802; 4,770,671; 4,881,951, or mixtures thereof. The abrasive particles may be individual abrasive grains or agglomerates of individual abrasive grains. The frequency (concentration) of the abrasive grains on the backing is also conventional. The abrasive grains can be oriented or can be applied to the backing without orientation, depending upon the requirements of the particular coated abrasive product.

The choice of abrasive particle type and size is somewhat dependent on the surface finish desired. The surface finish of the workpiece may be determined before and after abrasion by mounting the workpiece in the specimen holder of a profilometer instrument, such as that known under the trade designation "Rank Surtronic 3", available from Rank Taylor-Hobson, Leicester, England. $R_{tm}$, which is the mean of the maximum peak-to-valley values from each of 5 sampling lengths, is typically recorded for each test. It is desirous to produce a coated abrasive that exhibits an increase in cut while producing an acceptable surface finish on the workpiece.

Methods of Making Abrasive Articles

One advantage of the process of making the abrasive articles of this invention over those previously known is the reduction in VOC emissions by the use of low free aldehyde resins. The inclusion of urea derivative reactants in the coatable binder precursor tions described herein also significantly reduces formaldehyde emissions during curing of the binder precursor compositions, and may also increase water tolerance of the uncured binder precursor composition. Careful selection of the urea-aldehyde resin and will allow coatable viscosities to be obtained with only water as solvent. Organic solvents contributing to atmospheric VOC are then not required for viscosity adjustment.

In the manufacture of coated abrasive articles of the invention, the coatable binder precursor compositions of this invention, when cured, can be used as a treatment coating for the backing, e.g., cloth, paper, or plastic sheeting, to saturate or provide a back coating (backsize coating) or front coating (presize coating) thereto, as a make coating to which abrasive grains are initially anchored, as a size coating for tenaciously holding abrasive grains to the backing, or for any combination of the aforementioned coatings. In addition, the coatable binder precursor compositions of this invention, when cured, can be used in coated abrasive article embodiments where only a single-coating binder is employed, i.e., where a single-coating takes the place of a make coating/size coating combination.

When the coatable binder precursor compositions of the present invention are applied to a backing in one or more treatment steps to form a treatment coating, the treatment coating can be cured thermally by passing the treated backing over a heated drum; there is no need to festoon cure the backing in order to set the treatment coating or coatings. After the backing has been properly treated with a treatment coating, the make coating can be applied. After the make coating is applied, the abrasive grains are applied over the make coating. Next, the make coating, now bearing abrasive grains, is exposed to a heat source which generally solidifies or sets the binder sufficiently to hold the abrasive grains to the backing. Then the size coating is applied, and the size coating/abrasive grain/make coating combination is exposed to a heat source, preferably via a drum cure. This process will substantially cure or set the make and size coating used in the coated abrasive constructions.

The coatable binder precursor compositions of the present invention, when cured, only need to be in at least one of the binder layers, i.e., treatment coating, make coating, size coating, comprising the coated abrasive article. It does not need to be in every binder layer; the other binder layers can utilize various other binders known in the art, such as epoxy resin-based binders. If the binder of the present invention is in more than one layer, the curing conditions do not need to be the same for curing each layer of the coated abrasive.

It is also contemplated that cured versions of the coatable binder precursor compositions of this invention can be employed as a binder for nonwoven abrasive products. Nonwoven abrasive products typically include an open, porous, lofty, mat of fibers having abrasive grains bonded thereto by a binder. In one preferred embodiment, the method comprises combining a 30–95% solids solution of a urea-aldehyde resin with abrasive grains to form a coatable, thermally curable binder precursor slurry, coating the coatable, thermally curable binder precursor slurry onto at least a portion of the fibers of a lofty, open fibrous mat, and subjecting the resulting structure to conditions sufficient to affect curing of the binder precursor composition, preferably by passing heated air or other fluid through the coated web. Optionally, additional abrasive grains may be applied prior to curing the binder precursor solution, for example, by electrostatic precipitation or electrospray methods. A suitable electrospray coating process is described in U.S. Pat. No. 4,748,043, incorporated by reference herein.

In formulating the binder precursor compositions of the invention, it is sometimes desired to blend in a resin emulsion, and this blend utilized as a cloth treating resin for a cloth backing containing synthetic yarns, or used as the make and/or size coating. Binder precursor compositions having the above described properties are very compatible with resin emulsions. A "compatible" binder precursor/resin emulsion mixture will preferably result in a clear film upon drying, although this is not required. It is believed that this compatibility may be attributed to the composition of the binder precursors used in the invention which do not contain organic solvent and have the abovedescribed free aldehyde levels.

Examples of resin emulsions that can be included in the binder precursor compositions of the invention include acrylonitrile butadiene emulsions, acrylic emulsions, butadiene emulsions, butadiene styrene emulsions and combinations thereof. These resin emulsions are commercially available from a variety of different sources including those acrylic resin emulsions known under the trade designations "Rhoplex" and "Acrylsol", commercially available from Rohm and Haas Company; the acrylic latices known under the trade designations "Flexcryl" and "Valtac" commercially available from Air Products & Chemicals Inc.; the acrylic latices known under the trade designations "Synthemul" and "Tylac", commercially available from Reichold Chemical Co.; the acrylic and nitrile latices known under the trade designations "Hycar" , and the styrene/butadiene latex known under the trade designation "Goodrite", commercially available from B. F. Goodrich; the latex known under the trade designation "Chemigum" commercially available from Goodyear Tire and Rubber Co.; the latex "Neocryl" commercially available from ICI; the latex known under the trade designation "Butafon" commercially available from BASF; and the latex known under the trade designation "Res" commercially available from Union Carbide. The resin emulsions are typically and preferably 100 percent water based and do not contain any organic solvent for the purposes of this invention. However, some resin emulsions may contain a very minor amount, i.e., less than 20 weight percent, preferably less than 10 weight percent, and most preferably less than 5 weight percent organic solvent.

It is also within the scope of this invention that more than one resin emulsion may be included in the binder precursors of the invention. The ratio on a solids basis will range from about 10 to 99 percent urea-aldehyde resin to about 1 to 90 percent resin emulsion, preferably between 50 to 95 percent urea-aldehyde resin to about 5 to 50 percent resin emulsion, and most preferably 75 to 95 percent urea-aldehyde resin to about 5 to 25 percent resin emulsion.

If the binder precursor compositions of the invention are not incorporated into all of the aforementioned coatings of a coated abrasive, then other resinous adhesives can be utilized for the coatings not made using the urea-aldehyde binder precursor. Examples of other typical and preferred resinous adhesives include acid and base-cured phenolic resins, aminoplast resins, melamine resins, epoxy resins, polyurethane resins, isocyanurate resins, urea-formaldehyde resins, isocyanurate resins, radiation-curable resins (i.e., resins made using one or more unsaturated monomers) such as acrylated urethane resins, acrylated epoxy resins, and the like, resin emulsions as above-described, and mixtures thereof.

Additionally, the urea-aldehyde resins of the binder precursors of this invention can be blended with one or more of the following resinous adhesives and then this mixture utilized in one or more of the coatings: acid-cured phenolic resins, melamine resins, and the above-described resin emulsions. Two resins commonly mixed with urea-formaldehyde resins are: 1) the chemical known under the trade designation "VINAC 281", a polyvinyl acetate homopolymer, and 2) the chemical known under the trade designation "VINAC 400", a vinyl acetate/ethylene oxide copolymer, both available from Air Products, Allentown, Pa.

There are two main types of phenolic resins: resole and novolac. Resole phenolic resins have a molar ratio of formaldehyde to phenol of greater than or equal to one, typically between 1.0 to 3.0, and are base catalyzed. Novolac phenolic resins have a molar ratio of formaldehyde to phenol of less than one, are typically in the form of a powder, and are typically acid catalyzed. This invention contemplates that liquid resole phenolic resins can be used in coatings separate from the acid catalyzed urea-formaldehyde resins used in the invention, and that acid-curable phenolics may be used either in separate coatings, or mixed with acid curable urea-formaldehyde resins.

Phenolic binder precursors, if used in the invention, preferably consist essentially of the reaction product of phenol and formaldehyde. Particularly preferred base catalyzed phenolic binder precursors useful in the invention will have a molar ratio of formaldehyde to phenol between 1.50:1 to about 2.5:1, preferably between 1.60:1 to 2.2:1, most preferably between about 1.8:1 to about 2.0:1.

If a phenolic binder precursor is to be mixed in liquid form with the acid curable urea-aldehyde resins used in this invention, an acid-catalyzed phenolic resin must be used. The presence of this acidic catalyst typically and preferably enhances the reaction or polymerization rate of the urea derivative and aldehyde of the binder precursor. The pH of the binder precursor should range from about 2 to about 7, more preferably from about 2 to 5.

Examples of acidic catalysts include hydrochloric acid, nitric acid, formic acid, p-toluene-sulfonic acid, and combinations thereof. The preferred acidic catalyst is hydrochloric acid.

The amount of acidic catalyst should be less than 5 percent, preferably less than 2 percent, more preferably less than 1 percent and most preferably between 0.5 to 0.9 percent by weight of the urea-aldehyde resin.

Test Methods

The following test methods were used to characterize the compositions and articles of the invention.

Peak Exotherm Temperature

Differential scanning calorimetry (DSC) thermograms of samples of binder precursor solutions were obtained with a DSC machine known under the trade designation "Series 9990 Differential Thermal Analyzer", from E.I. dupont de Nemours & Co., Wilmington, Del. ("duPont"). The machine was operated at a heating rate of 10° C./min over a temperature range of 20°–140° C. The binder precursors tested were weighed and mixed in a separate container. A small amount of the binder precursor to be tested (50–90 mg) was then placed in a large volume capsule, and the capsule immediately hermetically sealed. A sealed capsule containing the binder precursor to be tested was then placed in the machine and heated at the rate mentioned above to determine the peak exotherm temperature, which appeared as a maximum temperature peak on a chart readout. Differential scanning calorimetry is described generally in the article by Watson et al., *A Differential Scanning Calorimeter for Quantitative Differential Thermal Analysis*, Anal. Chem., Vol. 36, No. 4, pp. 1233–1238 (June, 1964).

Pot Life Test

The pot life of a binder precursor solution is generally considered to be the length of time from initial mixing of catalyst into the resin ingredients until the viscosity of the binder precursor solution increases twofold over its initial viscosity. The viscosities were measured using a Brookfield viscometer, #3 spindle, at 30 rpm, at about 25° C.

Gel Time at 75° C.

Gel time gives an indirect measurement of the degree of polymerization at a particular catalyst level. The lower the gel time the more advanced in molecular weight the resin is considered to be. A commercially available gel time apparatus known by the trade designation "Sunshine Gelmeter" available from Sunshine Co., was used in each measurement. This gel time measuring apparatus is a torsion apparatus, wherein a glass rod (168 mm long by 6.35 mm diameter) is attached at one end via a chuck to a torsion wire (0.254 mm diameter music wire, available from Sunshine Co.), with the torsion wire in turn attached to a drive mechanism via a magnetic coupling so that the wire/glass rod combination hang vertically from the drive mechanism. About 2.81 cm of wire existed between the chuck and the magnetic coupling. A test tube (150 ×18 mm) was filled to about 65 mm depth with the resin to be tested (originally at 25° C.±3° C.), and the tube placed in a water bath which was at 75° C. The glass rod was lowered into the resin with the lower end of the glass rod about 6.35 mm from the tube bottom, and so that the resin level in the tube was below the water bath level. The glass rod/torsion wire were then rotated in the bath by the drive mechanism. As this combination was rotated a projection extending from the chuck connecting the glass rod and torsion wire also rotated, finally touching a similar, stationary projection extending from the machine. The gap between the projections was originally set at 2.38 mm for each test. The time required for the rotating projection to touch the stationary projection was recorded as the gel time for each resin.

Dry Schiefer Test

This test provided a measure of the cut (material removed from a workpiece) and finish (the relative quality of the abraded surface) of coated abrasive articles under dry conditions (about 22° C. and about 45% Relative Humidity).

A 10.16 cm diameter circular specimen was cut from the abrasive material tested and secured by a pressure-sensitive adhesive (3M Industrial Tape #442 double adhesive tape) to a back-up pad. The back-up pad was secured to the driven plate of a Schiefer Abrasion Tester (available from Frazier Precision Company, Gaithersburg, Md). Doughnut shaped cellulose acetate butylate plastic workpieces, 10.16 cm outside diameter, 5.24 inside diameter, 1.27 cm thick, available plastic from Sielye Plastics, Bloomington, Minn. were employed as workpieces. The initial weight of each workpiece was recorded to the nearest milligram prior to mounting on the workpiece holder of the abrasion tester. A 4.54 kg weight was placed on the abrasion tester weight platform and the mounted abrasive specimen lowered onto the workpiece and the machine turned on. The machine was set to run for 500 cycles and then automatically stop. After each 500 cycles of the test, the workpiece was wiped free of debris and weighed. The cumulative cut for each 500-cycle test was the difference between the initial weight and the weight following each test.

Off-Hand Abrasion Test

A steel substrate having a known paint film was abraded in each case with coated abrasives made in accordance with the invention which were attached to a random orbital sander (known under the trade designation "DAQ" from National Detroit, Inc ) The steel substrate having a paint film was purchased in each case from ACT Company of Hillsdale, Mich., and consisted of a steel substrate coated with 0.074 mm–0.127 mm thick paint. The paint was a dupont base-coat clear-coat paint known under the trade designation "RK7103", coated by the ACT Company using General Motors paint specification no. 998–4065. The cut in grams was computed in each case by weighing the paint-coated substrate before abrading and after abrading for a predetermined time, for example 1, 2, or 3 minutes.

MATERIALS

The following materials were used as described in the examples (quotation marks indicate trade designations):

AL3029 from Borden Chemical, is an unmodified (i.e. contains no furfural) urea-formaldehyde resin, 65% solids, 325 cps (Brookfield viscometer, #3 spindle, 30 rpm, at 25° C., a free formaldehyde content of 0.1–0.5%, and a F/U of 1.4–1.6.

The chemical known under the trade designation "TERGITOL" is a nonionic surfactant available from Union Carbide;

"P-320" is grade P-320 aluminum oxide abrasive grains, available under the trade designation "ALODUR FRPL" from Treibacher, Treibach, Austria;

"$AlCl_3$" is 28 percent by weight aqueous solution of $AlCL_3 \cdot 6H_2O$ in water, available from PVS Chemicals, Detroit, Mich.;

"$NH_4Cl$" is ammonium chloride which can be obtained from a number of suppliers, and is dissolved in water at about 25 weight percent;

"AMP" is 2-amino-2-methyl-1-propanol, available from Kodak, Chemicals; and

"A" weight paper is a paper weighing between 80–110 g/m² with a latex barrier coat to allow topical application of a make coating resin;

"A3469" is a designation for a dispersion of zinc stearate in water, also containing a cellulosic binder.

In addition to the above, glycerol was used in Example 9 as a plasticizer. Feldspar, an aluminosilicate, was used in Example 9 as a filler.

EXAMPLE 8

The following non-limiting examples will further illustrate the present invention. All coating weights are specified in grams/square meter (g/m²). All resin formulation ratios and percentages are based upon weight, and the weight ratio of formaldehyde to urea in the urea-formaldehyde resin used to make the coatable binder precursors ranged from about 1.4:1 to about 1.6:1 (standard urea-formaldehyde resin available from Borden Chemical, known under the trade designation AL3029.

Comparative Examples A–F and Examples 1–6

For comparison purposes it is best to compare the single catalyst systems to the combined catalyst system. Thus, a Comparative Example of the single catalyst systems was compared with the cocatalyst system used in the present invention.

In Examples 1–6 and Comparative Examples A–C, make coatings were applied using "typical factory conditions" to "A" weight paper backings. Typical factory conditions included a make coating of 8–62 gm/m² wet weight (4.2–32.2 gm/m² dry weight); Grade P-320 aluminum oxide abrasive particles electrostatically coated onto the make coating and the make coating then cured at 60°–90° C. for 2–45 minutes; and size coating (same composition as make coating) applied at wet weight of 29°–124 gm/m² (dry weight of 16–68 gm/m²) and cured at 50°–90° C. for 2–90 minutes. Examples 1–6 and Comparative Examples A–C employed A3469 as a supersize coating.

When $AlCl_3$ was used alone as catalyst (Comparative Examples A–C), the gel time, pot life and peak exotherm temperatures were all dependent on the concentration of the $AlCl_3$. This data is summarized in Table 1. Performance of coated abrasives of Comparative Examples D–F (similar to Comparative Examples A–C except for slightly different amounts of $AlCl_3$) was also dependent upon the concentration of $AlCl_3$ and the cure conditions (time and temperature). This is shown in Table 2.

In order to achieve a good performing product, using factory cure conditions (i.e. curing temperature of about 80°–85° C., web speed ranging from 10 to 100 meters/min), the concentration of $AlCl_3$ must be near 1 weight percent, based on weight of solution. The drawback with a 1 weight percent concentration of $AlCl_3$ was that the pot-life was way too short for the batch operation used in the factory.

When $NH_4Cl$ was used alone as the catalyst (Comparative Examples G–I, Table 3), the gel time, pot life and peak exotherm temperatures were all independent of the $NH_4Cl$ concentration, affording an advantage over the use of a Lewis acid catalyst. However, the activity (ability of a catalyst to catalyze the reaction) of the $NH_4Cl$ was found to be dependent on the free formaldehyde concentration in the binder precursor solution due to the following reaction (5):

$$6CH_2(OH)_2 + 4NH_4Cl \rightarrow (CH_2)_6N_4 + 4HCl + 12H_2O. \qquad (5)$$

With the low free aldehyde resins, such as that known under the trade designation AL3029 from Borden Chemical, the $NH_4Cl$ did not activate the condensation reaction (4) very readily until the temperature of the reaction was increased above that normally used. However, as mentioned above, increased temperature tended to curl the edges of the coated abrasive and did not render performance improvements. The performance of the coated abrasive was independent of the $NH_4Cl$ concentration. Thus, the drawbacks of the use of $NH_4Cl$ were the long gel times, and only moderate performance levels obtained with typical factory cure conditions.

Figure 1:
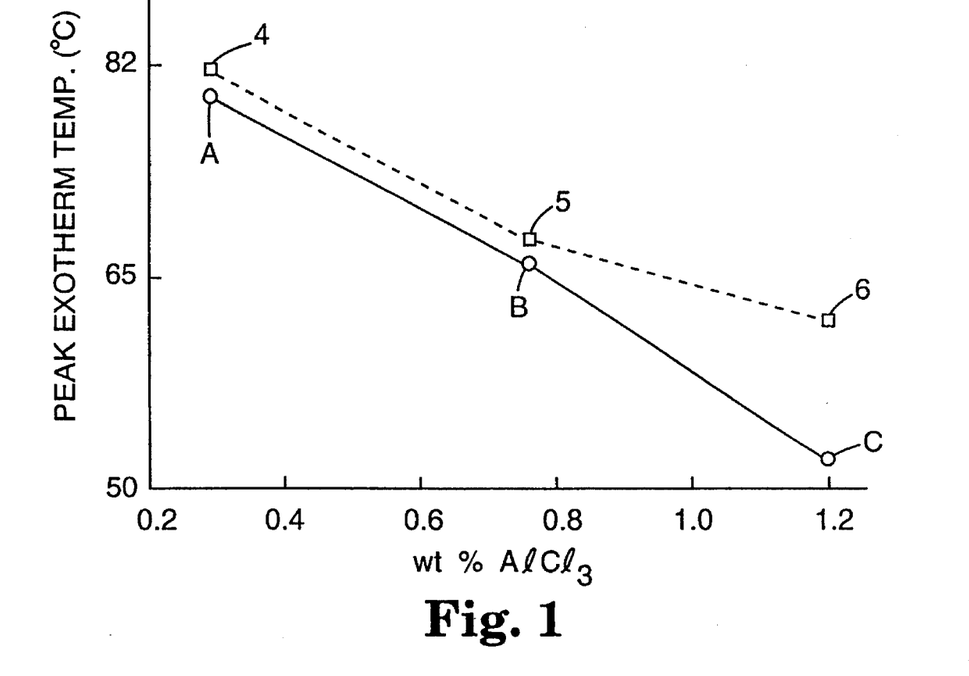
FIGS. 1 and 2 (discussed in the Examples) illustrate graphically the apparent catalytic activity of various catalysts in binder precursor solutions as determined by differential scanning calorimetry.
Figure 2:
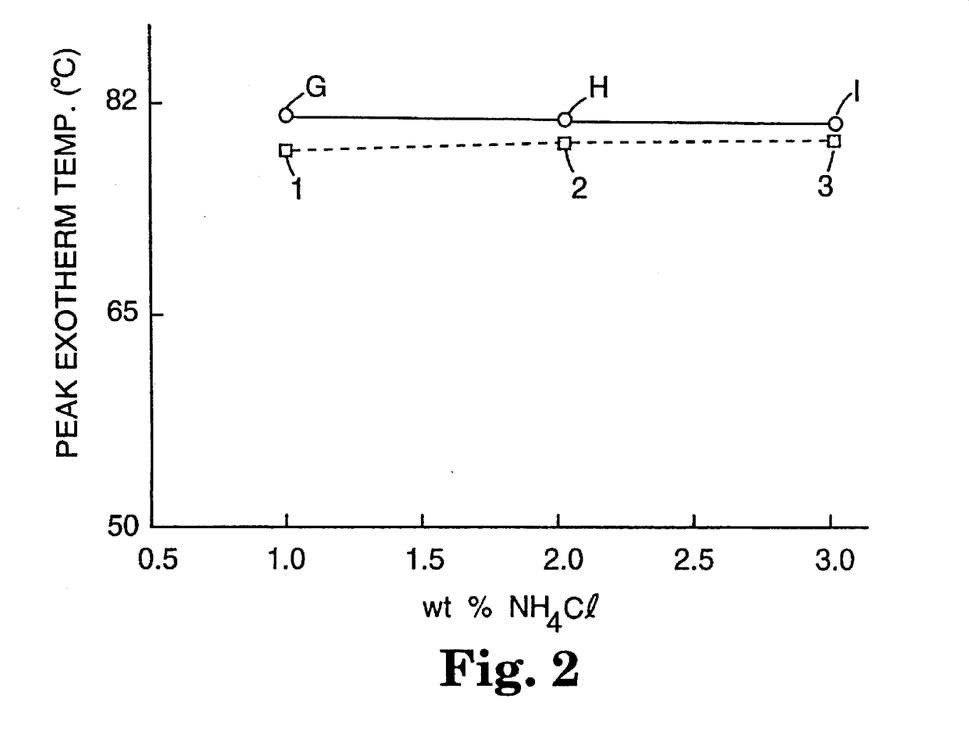

In Examples 1–6 (Tables 4 and 5), the urea-formaldehyde resin known under the trade designation AL3029 was catalyzed with x % $AlCl_3$+y % $NH_4Cl$ (cocatalyst), and the gel time, pot life and DSC peak exotherm temperatures were all dependent on the $AlCl_3$ concentration and independent of the $NH_4Cl$ concentration. Based on the DSC data (FIGS. 1 and 2), there would be little difference expected in activity between the AL3029 +x% $AlCl_3$ catalyst used in the binder precursor solutions of Comparative Examples A–F and the cocatalyst AL3029R+2% $NH_4Cl$+x% $AlCl_3$ used in Examples 4–6. What was observed experimentally, however, in comparing Example 7 and Comparative Example J (Table 7), when these catalysts were compared in size resins for grade P-320 coated abrasives, was that when the cocatalyst was used with the AL3029 resin, a 20–30% increase in performance (defined in Table 2) over the AL3029R+x % $AlCl_3$ binder precursor solutions was obtained using the same cure conditions.

The reason for the improved activity observed using the cocatalyst system in the binder precursor solutions of the invention is believed to be that the $NH_4Cl$ increased the kinetics of the curing reaction. It can also be descriptively thought of that the more active $AlCl_3$ initiated the reaction, which generated free formaldehyde, which in .turn yields additional HCl via reaction (5), lowering the pH and increasing the kinetics of the condensation reaction.

Example 8

A binder precursor solution of the present invention containing the cocatalyst was coated onto "A" weight paper in a factory experiment. The formulation in Table 7 was coated as a size resin over a glue make resin and Grade P-320 aluminum oxide abrasive grains for Example 8, while Comparative Example K was a coated abrasive having a construction known under the trade designation "STIKIT GOLD PAPER A WEIGHT", available commercially from Minnesota Mining and Manufacturing Company, St. Paul, Minn. Both size resins were coated over the same make coating and abrasive grains, at the same weights and were cured using the same oven conditions. Both samples were tested via the Off-hand Abrasion Test using as supersize coating A3469. The results of Off-hand abrasion tests are summarized in Table 8. In this case, the binder precursor solution of the invention which included a cocatalyst system (Example 8) showed a significant cut increase over Comparative Example K.

Example 9 and Comparative Example L

Another factory experiment was performed using the cocatalyst to determine a way to improve performance (via more cure) in a coarse grade urea-formaldehyde size coating/glue make coating construction. Comparative Example L used a size resin system containing 54% A3029R urea-formaldehyde resin, 23.8% $H_2O$, 0.2% 2-amino-2-methyl-1-propanol (AMP), 5.2% glycerol, 9.9% feldspar, and 0.75% $AlCl_3$ as catalyst, which yielded coated abrasive after factory curing that was 25–30% undercured (based on performance testing using the Dry Schiefer Test and the definition of "fully cured" as defined in Table 2). On the other hand, Example 9, a coated abrasive made using a size resin consisting of 54% AL3029R, 23.8% $H_2O$, 9.9% feldspar, 5.2% glycerol, 6.3% $NH_4Cl$, 0.6% $AlCl_3$, and 0.16% AMP was only 5–11% undercured. This system also allowed coating at faster web speeds.

TABLE 1

Comparative Examples A–C
Physical properties of AL3029R + X% $AlCl_3$.

| Comp. Ex. | A | B | C |
| --- | --- | --- | --- |
| wt. % $AlCl_3$ | 0.3 | 0.75 | 1.20 |
| Gel Time at 75° C. (sec) | 105 | 70 | 45 |
| Pot Life (min) | 140 | 65 | 35 |
| Peak Exotherm Temp. (°C.) | 79 | 68 | 54 |

TABLE 2

Comparative Examples D–F
Performance data for AL3029R + X% $AlCl_3$

| Comp. Example | D | E | F |
| --- | --- | --- | --- |
| wt % $AlCl_3$ | 0.4 | 0.71 | 1.0 |
| Peak Exotherm Temp (°C.) | 77 | 69 | 61 |
| Cure Temp (15 min. at °C.) | 80 | 72 | 62 |
| Performance (% cured)* | 55% | 59% | 57% |

*% cured is defined as the average 2 minute cut of a coated abrasive cured at 10° C. above exotherm divided by the average 2 minute cut of post-cured samples (i.e. samples cured at 110° C. for about 60 minutes).

TABLE 3

Comparative Examples G–I
Physical properties of AL3029R + X% $NH_4Cl$.

| Comp. Ex. | G | H | I |
| --- | --- | --- | --- |
| wt % $NH_4Cl$ | 1.0 | 2.0 | 3.0 |
| Gel Time at 75° C. (sec) | 515 | 515 | 515 |
| Pot Life (min) | 1080 | 1080 | 1080 |
| Peak Exotherm Temp. (°C.) | 81 | 81 | 81 |

TABLE 4

Examples 1–3 Physical properties of
AL3029R + X% $NH_4Cl$ + 0.35% $AlCl_3$.

| Example | 1 | 2 | 3 |
| --- | --- | --- | --- |
| wt % $NH_4Cl$ | 1.0% | 2.0% | 3.0% |
| Gel Time at 75° C. (sec) | 95 | 95 | 90 |
| Pot Life (min) | 125 | 125 | 125 |
| Peak Exotherm Temp. (°C.) | 78 | 79 | 79 |

TABLE 5

Examples 4–6 Physical properties of
AL3029R + 2% $NH_4Cl$ + x% $AlCl_3$.

| Example | 4 | 5 | 6 |
| --- | --- | --- | --- |
| wt % $AlCl_3$ | 0.30% | 0.75% | 1.20% |
| Gel Time at 75° C. (sec) | 100 | 70 | 40 |
| Pot Life (min) | 125 | 55 | 40 |
| Peak Exotherm Temp. (°C.) | 81 | 69 | 63 |

TABLE 6

Comparison of AL3029R + x% AlCl₃ (Comparative Example J) with AL3029R + Y% NH₄Cl + x% AlCl₃ (Example 7)

|  | Comp. Ex. J | Ex. 7 |
|---|---|---|
| Peak Exotherm Temp (°C.) | 73 | 75 |
| Cure Temp (15 min) (°C.) | 76 | 78 |
| Performance (% cured)* | 60% | 83% |

*see Table 2 for definition

TABLE 7

Typical binder precursor formulation of the invention (Example 8)

| AL3029R (65% solids) | 87.2% |
|---|---|
| H₂O | 7.5% |
| NH₄Cl (25% solids) | 4.7% |
| AlCl₃ (28% solids) | 0.6% |

TABLE 8

| SIZE RESIN | 1 MIN CUT (gm) | 3 MIN CUT (gm) |
|---|---|---|
| Comp. Ex. K AL8405 + 1% AlCl3* | 2.14 | 4.27 |
| Example 8 AL3029R + Cocatalyst | 2.71 | 6.45 |

*the binder precursor solution known under the trade designation "AL8405" contains 7% furfuryl alcohol and 2–3% free formaldehyde

Examples 10–11 and Comparative Examples M–U

This set of examples compared the abrasion performance of coated abrasives made using various acid catalysts. Examples 10 and 11 used a cocatalyst. The catalyst used in Examples 10–11 and Comparative Examples M–U are listed in Table 9.

For Examples 10–11 and all of Comparative Examples M–U the urea-formaldehyde resin used as make and size coatings was AL3029R, with make coating weight of about 12 g/m² (wet) and size coating weight of about 49 g/m²(wet), using P-320 abrasive grains coated at about 40 g/m². The size resin was cured in each case at 71° C. for 10 minutes, and also a portion of each coated abrasive that had size resin cure at 71° C. for 10 minutes was further "post-cured" at 113° C. for 60 minutes. Also, each of the examples in Table 9 (both cured and post-cured samples) had a calcium stearate supersize coating, coated at about 21 g/m² (wet), which was cured for 1 minute at 91° C.

Catalyst amounts in each instance were adjusted to give a binder precursor pH of about 4.1–4.3. In each case where AlCl₃ and FeCl₃ were used, they were present at 0.4 weight percent; NH₄Cl and (NH₄)₂SO₄ were used at 2.0 weight percent; p-toluene sulfonic acid (PTSA) was present at 0.65 weight percent; and formic acid (FA) was present at 0.25 weight percent, all referenced to total solids weight of the binder precursor solutions. "Cut" was determined using the Off-Hand Abrasion Test, described previously, using an abrasion time of 2 minutes. In addition, the "% cured" (as defined in Table 2) is also listed in Table 9.

TABLE 9

| Ex. | Catalyst | 71° C. cured cut (gm) | post-cured cut (gm) | % cured |
|---|---|---|---|---|
| 10 | AlCl₃ + NH₄Cl | 4.92 | 7.70 | 63.9 |
| 11 | AlCl₃ + (NH₄)₂SO₄ | 3.57 | 8.20 | 43.5 |
| M | NH₄Cl | 2.48 | 6.52 | 38.1 |
| N | AlCl₃ | 3.57 | 7.74 | 46.1 |
| O | (NH₄)₂SO₄ | 2.47 | 7.26 | 34.0 |
| P | FeCl₃ | 3.07 | 7.87 | 39.0 |
| Q | FeCl₃ + NH₄Cl | 3.33 | 7.83 | 42.5 |
| R | PTSA | 3.38 | 7.84 | 43.1 |
| S | PTSA + NH₄Cl | 3.43 | 7.59 | 45.2 |
| T | FA | 1.39 | 7.21 | 19.3 |
| U | FA + NH₄Cl | 1.80 | 7.38 | 24.4 |

From Table 9 it is evident that the use of the cocatalyst AlCl₃+NH₄Cl in Example 9 produced a coated abrasive that was significantly (at least 17.8%) more cured than the any of the comparative examples, and the coated abrasive of Example 9 exhibited greater abrasion ability than use of AlCl₃ or NH₄Cl alone. Also, the use of the cocatalyst AlCl₃+(NH₄)₂SO₄ exhibited the highest "post-cure" cut of all examples.

The above examples demonstrate that the binder precursor solutions of the invention exhibited increased activity such that a sufficient cure could be achieved under typical factory conditions while the pot life of the binder precursor solutions were adequate for factory operations.

This work also provided evidence that abrasive articles made with the coatable binder precursor solutions of the invention can perform as well as or better than previously known abrasives. Although the above examples are intended to be representative of the invention, they are not intended to limit the scope of the appended claims.

What is claimed is:

1. A coated abrasive having a binder and abrasive particle attached to a backing, at least one layer of the binder comprises a cured urea-aldehyde binder, the cured urea-aldehyde binder derived from a coatable urea-aldehyde binder precursor composition comprising a urea-aldehyde resin and a cocatalyst, the urea-aldehyde resin having a aldehyde/urea mole ratio ranging from about 1.0 to about 2.0 and a free aldehyde content ranging from about 0.1 to about 1.0 weight percent based on weight of total aldehyde, said cocatalyst consisting essentially of a Lewis acid and a salt, said salt selected from the group consisting of organic amine salts and ammonium ion salts.

2. Coated abrasive in accordance with claim 1, wherein said at least one layer is a make coating.

3. Coated abrasive in accordance with claim 1, wherein said at least one layer comprises make and size coatings.

4. Coated abrasive in accordance with claim 1, which includes a load-resistant supersize coating.

5. Coated abrasive in accordance with claim 1 which includes a pressure-sensitive adhesive backsize coating.

6. Coated abrasive in accordance with claim 1 which includes a glue make coating and wherein the cured urea-aldehyde binder is a size coating.

7. Coated abrasive in accordance with claim 1 which includes a make coating selected from the group consisting of melamine resin, latices, radiation-cured polymers, and phenolic resins.

8. Coated abrasive in accordance with claim 1 wherein said cured urea-aldehyde binder has blended therein a resin selected from the group consisting of melamine resin, latices, acid-cured phenolic resins, and mixtures thereof.

9. Coated abrasive in accordance with claim 1 wherein said backing comprises cloth and wherein said cured urea-aldehyde binder is provided as a presize coating.

10. Coated abrasive in accordance with claim 1 wherein said backing comprises cloth and wherein said cured urea-aldehyde binder is provided as a saturant coating.

11. Coated abrasive in accordance with claim 1 wherein said backing comprises cloth and wherein said cured urea-aldehyde binder is provided as a backsize coating.

12. Coated abrasive in accordance with claim 1 wherein said cured urea-aldehyde binder has blended therein a filler.

13. Coated abrasive in accordance with claim 1 wherein said cured urea-aldehyde binder has blended therein a grinding aid.

14. A nonwoven abrasive article in the form of an open, lofty, three-dimensional web of fibers bonded together at a plurality of points where the fibers contact each other by a cured urea-aldehyde binder, the cured urea-aldehyde binder made from a binder precursor composition comprising a urea-aldehyde resin and a cocatalyst, the urea-aldehyde resin having an aldehyde/urea mole ratio ranging from about 1.0 to about 2.0 and a free aldehyde content ranging from about 0.1 to about 1.0 weight percent based on weight of total aldehyde, said cocatalyst consisting essentially of a Lewis acid and a salt, said salt selected from the group consisting of organic amine salts and ammonium ion salts.

15. Method of making a coated abrasive having a plurality of abrasive particles secured to a backing by a urea-aldehyde binder, the method comprising the steps of:

(a) providing a coatable binder precursor composition comprising a urea-aldehyde resin and a cocatalyst, the urea-aldehyde resin having an aldehyde/urea ratio ranging from about 1.0 to about 2.0 and a free aldehyde content ranging form about 1.0 to about 1.0 weight percent based on weight of total aldehyde, said cocatalyst consisting of a Lewis acid and a salt, said salt selected from the group consisting of organic amine salts and ammonium ion salts;

(b) coating said compositions onto a backing to form a coated backing;

(c) applying a plurality of abrasive particles to said coated backing; and (d) subjecting the product of step (c) to conditions sufficient to cure said urea-aldehyde resin.

16. Method in accordance with claim 15 wherein the weight ratio of said Lewis acid to said salt ranges from about 0.6:1 to about 0.15:1.

17. Method in accordance with claim 15 wherein said aldehyde is formaldehyde, said ratio of said aldehyde to said urea ranges from about 1.0 to about 2.0, said Lewis acid is aluminum chloride, and said ammonium salt is ammonium chloride.

18. Method of making a coated abrasive having a plurality of abrasive particles secured to a paper backing by a urea-aldehyde binder, the method comprising the steps of:

(a) providing a coatable binder percursor composition comprising a urea-aldehyde resin and a cocatalyst, the urea-aldehyde resin having an aldehyde/urea mole ratio ranging from about 1.0 to 2.0 and a free aldehyde content ranging from about 0.1 to about 1.0 weight percent based on weight of total aldehyde, said cocatalyst consisting of a Lewis acid and a salt, said salt selected from the group consisting of organic amine salts and ammonium ion salts;

(b) coating said composition onto said paper backing to form a coated paper backing, said paper backing having an uncoated weight ranging from about 80 to about 110 g/m$^2$;

(c) applying a plurality of abrasive particles to said coated paper backing; and (d) subjecting the product of step (c) to conditions sufficient to cure said urea-aldehyde resin.

19. Method in accordance with claim 18 wherein the weight ratio of said Lewis acid to said salt ranges from about 0.6:1 to about 0.15:1.

20. Method in accordance with claim 18 wherein said aldehyde is formaldehyde, said Lewis acid is aluminum chloride, and said ammonium salt is ammonium chloride.

21. Coated abrasive in accordance with claim 1 wherein said backing comprises paper.

22. Coated abrasive in accordance with claim 1 wherein said binder precursor composition is devoid of furfural.

23. Nonwoven abrasive article in accordance with claim 14 wherein said binder precursor composition is devoid of furfural.

24. Method in accordance with claim 15 wherein said binder precursor composition is devoid of furfural.

25. Method in accordance with claim 18 wherein said binder precursor composition is devoid of furfural.

* * * * *

UNITED STATES PATENT AND TRADEMARK OFFICE
CERTIFICATE OF CORRECTION

PATENT NO.: 5,486,219

DATED: January 23, 1996

INVENTOR(S): Jeffrey E. Ford, Ellen Y. Chu and Harold E. Rude

It is certified that error appears in the above-identified patent and that said Letters Patent is hereby corrected as shown below:

Column 16, line 6, please delete "EXAMPLE 8" and insert therefore --EXAMPLES--.

Column 16, line 32, please delete "°" after 29.

Column 21, line 35, please delete "form" and insert therefore --from--.

Column 21, line 35, please delete "1.0" and insert therefore --0.1--.

Signed and Sealed this

Seventh Day of April, 1998

Attest:

BRUCE LEHMAN

Attesting Officer

Commissioner of Patents and Trademarks